United States Patent
Gronowicz et al.

[11] Patent Number: 6,048,020
[45] Date of Patent: Apr. 11, 2000

[54] ELECTRICAL INTERCONNECTION MODULE FOR VEHICLE INSTRUMENT PANEL

[75] Inventors: William Gronowicz, Westland; Mark Steven Rosales, Southfield; Masa Saito, West Bloomfield, all of Mich.

[73] Assignee: Yazaki Corporation, Tokyo, Japan

[21] Appl. No.: 09/021,922

[22] Filed: Feb. 11, 1998

[51] Int. Cl.[7] .................................................. B62D 25/14
[52] U.S. Cl. ................................ 296/70; 439/34; 180/96; 307/9.1; 307/10.1; 174/72 A
[58] Field of Search ................................ 296/70; 439/34; 180/90; 280/752; 307/10.1, 9.1; 179/72 A

[56] References Cited

U.S. PATENT DOCUMENTS

| | | |
|---|---|---|
| 4,355,853 | 10/1982 | Kourimsky . |
| 4,909,748 | 3/1990 | Kozono et al. . |
| 4,910,641 | 3/1990 | Yanase ................................... 439/34 X |
| 4,942,499 | 7/1990 | Shibata et al. ......................... 439/34 X |
| 4,950,168 | 8/1990 | Watanabe et al. ......................... 439/34 |
| 5,297,334 | 3/1994 | Johnson . |
| 5,324,203 | 6/1994 | Sano et al. ............................... 296/70 X |
| 5,327,643 | 7/1994 | Sakamoto et al. ................. 179/72 A X |
| 5,353,190 | 10/1994 | Nakayama et al. .................... 439/34 X |
| 5,442,518 | 8/1995 | Beam . |
| 5,467,520 | 11/1995 | Nunez et al. . |
| 5,484,221 | 1/1996 | DeCoux . |
| 5,501,605 | 3/1996 | Ozaki et al. ............................... 439/34 |
| 5,549,344 | 8/1996 | Nishijima et al. ......................... 296/70 |
| 5,556,153 | 9/1996 | Kelman et al. . |
| 5,663,866 | 9/1997 | Ichikawa et al. ....................... 439/34 X |
| 5,709,358 | 1/1998 | Kubota . |
| 5,711,675 | 1/1998 | Nishitani et al. ...................... 439/34 X |
| 5,712,764 | 1/1998 | Baker et al. . |
| 5,743,010 | 4/1998 | Zaguskin et al. ...................... 439/34 X |
| 5,771,575 | 6/1998 | Onizuka et al. . |
| 5,856,908 | 1/1999 | Takiguchi et al. .................... 439/34 X |

FOREIGN PATENT DOCUMENTS

| | | | |
|---|---|---|---|
| 3903232 | 7/1990 | Germany ................................ 296/70 |
| 1-17827 | 5/1989 | Japan . |
| 1-212636 | 8/1999 | Japan . |

OTHER PUBLICATIONS

Communication from Foreign Patent Office (Japan) dated Oct. 5, 1999.

*Primary Examiner*—D. Glenn Dayoan
*Assistant Examiner*—Jason Morrow
*Attorney, Agent, or Firm*—Young & Basile, P.C.

[57] ABSTRACT

An electrical interconnection module forms part of the structure of an automotive vehicle instrument panel and connects electrical components disposed thereon with a bulkhead connector on the forward fire wall of the vehicle. The interconnection module has electrical connectors disposed thereon at various locations for making connection with the electrical components. A plurality of bus bars are disposed in a group on the surface of the module and form part of an electrical junction block integrated with the module. Narrow grooves extend along the surfaces of the module and have wires embedded therein to provide electrical interconnection between the connectors and the bus bars. The bus bars and the terminals of the electrical connectors comprise insulation displacement connectors for making connection with the wires.

20 Claims, 7 Drawing Sheets

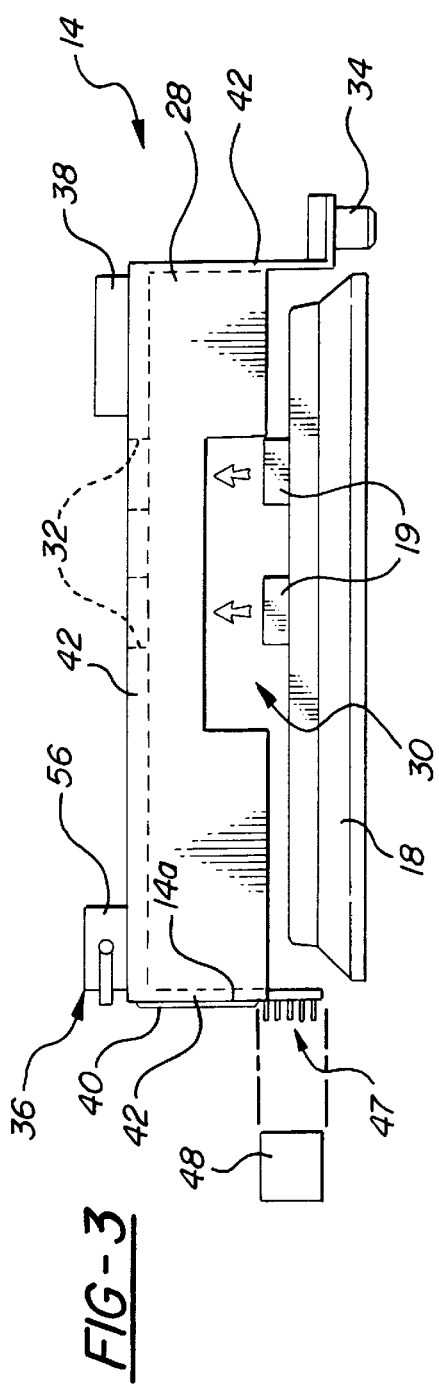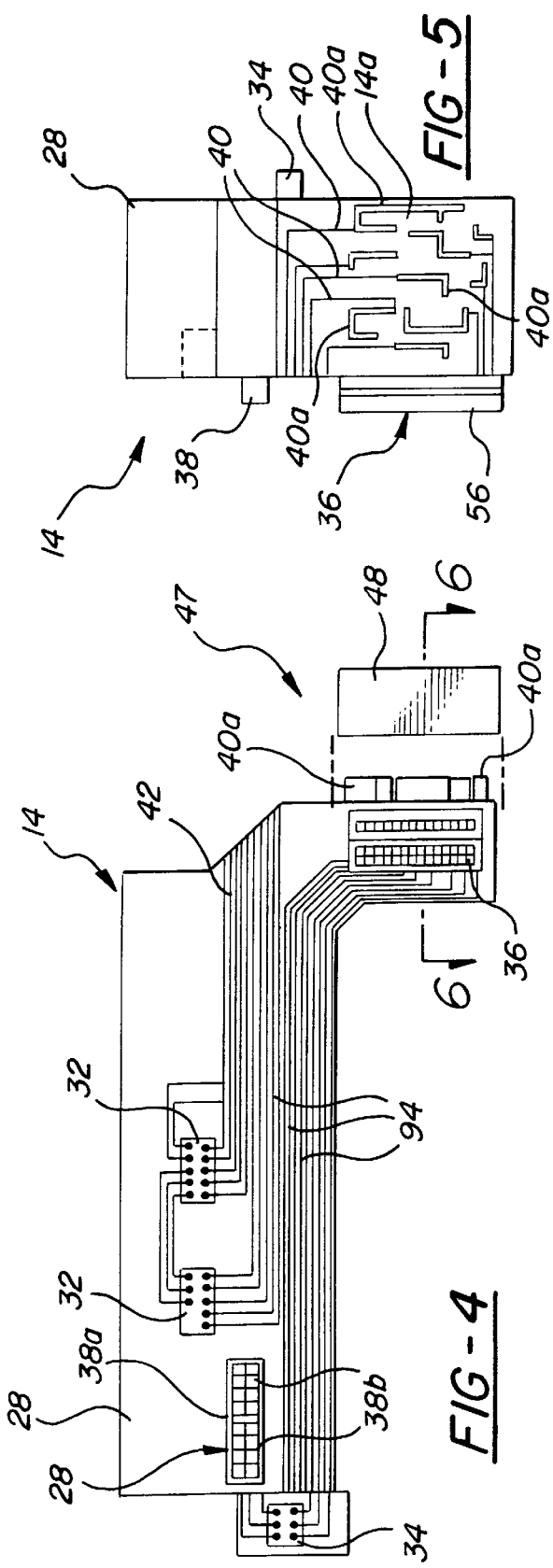

ELECTRICAL INTERCONNECTION MODULE FOR VEHICLE INSTRUMENT PANEL

FIELD OF THE INVENTION

This invention relates generally to electrical components of an automotive vehicle instrument panel, and more particularly to a module for supplying power to and interconnecting the electrical components and having an integrally formed junction block.

BACKGROUND OF THE INVENTION

In conventional automotive vehicle construction, wire harnesses are widely used to interconnect and supply power to the various components making up the electrical system of the vehicle. Numerous electrical components are mounted in and on a vehicle instrument panel, and wire harnesses are routed behind or beneath the instrument panel to interconnect the components. The wire harnesses are secured to the instrument panel by various types of clips and straps. The instrument panel is usually built up as a subassembly prior to being inserted into the vehicle passenger compartment and attached to the bulkhead or fire wall separating the passenger compartment from the engine compartment. After the instrument panel has been installed in the passenger compartment, a worker must join connectors at the ends of the wire harnesses with mating connectors located on or adjacent to the fire wall to complete the electrical connection between the instrument panel and the rest of the vehicle.

The number of electrical components present in automotive vehicles has increased rapidly in the past several years, and consequently the amount of wiring required to interconnect and supply power to components has also increased. This increase in the number and complexity of electrical components is particularly significant in the instrument panel area. The amount of wiring required has increased to the point where it is difficult to find enough room to route the wire harnesses in and around the instrument panel. Manually attaching and routing the wire harnesses are time consuming and labor intensive tasks. If the harnesses are not correctly positioned, there is a risk that they may be damaged when the instrument panel is secured in place within the vehicle.

The increasing number of electrical systems in automotive vehicles has also resulted in the increased size and complexity of electrical junction blocks. Junction blocks are commonly used in automotive vehicles to simplify electrical system wiring by eliminating multi-branch wiring and consolidating fuses, relays, and other circuit components in a single location. A junction block typically comprises a housing having a plurality of integrally formed external receptacles for receiving electrical connectors, fuses, relays and other circuit components. One or more bus bars are contained within the housing and supply electrical power to the various components and then to the electrical systems. Each bus bar has a plurality of blade-like terminals which extend into the receptacles in order to make contact with the circuit components inserted therein.

It may be desirable to locate junction blocks for certain electrical systems in the passenger compartment so that the circuit components may be easily inspected and replaced if necessary. With the increasing number of electrical systems, it has become more difficult to find room for junction blocks in convenient locations within the passenger compartment.

U.S. Pat. No. 5,467,520 discloses a method for wiring a vehicle instrument panel wherein a system of troughs is attached to a structure serving as a wiring board, and wires are restrained within the troughs and extend between at least two terminals or connectors disposed remotely from one another at ends of the troughs. The wiring board is attached to the rear of the instrument panel such that the connectors engage mating connectors located on the various electrical components mounted on the instrument panel. The wires are placed into the troughs and secured therein by an automated wire feeding device.

U.S. Pat. No. 5,442,518 discloses a wiring system for a vehicle instrument panel wherein wires are disposed in troughs formed in the surface of a ventilation duct structure. The ventilation duct structure is attached to the rear of the instrument panel and the wires make connection with electronic subassembly components disposed on the instrument panel.

SUMMARY OF THE INVENTION

It is an objective of the present invention to provide a simplified wiring system for an automotive vehicle instrument panel.

It is another objective of the invention to provide a wiring system for an automotive vehicle instrument panel that may be installed by an automated process.

It is a further objective of the invention to provide a wiring system wherein assembly of an instrument panel is easier, faster and less sensitive to installation error.

It is another objective of the invention to provide an instrument panel wiring module having a junction block integrated therewith to save space and increase the ease of assembly.

It is a further objective of the invention to provide an instrument panel wiring system wherein the wires may be uninsulated.

These objectives are achieved by an electrical interconnection module which forms a part of the structure of an instrument panel. The interconnection module has electrical connectors disposed thereon at various locations, and a plurality of bus bars are disposed in a group on the surface of the module. The bus bars form part of an electrical junction block integrated with the module. Narrow grooves extend along the surfaces of the module and have wires embedded therein to provide electrical interconnection between the connectors and the bus bars.

Ends of some of the bus bars project substantially perpendicularly from the surface of the interconnection module to form blade terminals which extend into a junction block case to connect with circuit components such as fuses, circuit breakers or relays mounted to the junction block. The junction block may contain other layers of bus bars, in which case the bus bars disposed on the surface of the module form the lowermost layer of a multiple layer bus bar assembly. Integrating the junction block with the interconnection module in this fashion results in a reduction in the overall size of the junction block.

Electrical components such as an instrument cluster and a switch module are attached to the interconnection module such that electrical connectors on the components mate with the connectors on the interconnection module. After the components are attached to the interconnection module, the module is joined to the instrument panel housing. This joining operation may also place other connectors on the interconnection module in mating engagement with connectors on electrical components built into or otherwise attached to the instrument panel assembly.

When the instrument panel assembly has been completed, it is installed in the passenger compartment of the vehicle by securing it to the forward bulkhead or fire wall. This securing operation places connectors on a forward-facing surface of the interconnection module in engagement with connectors disposed on the fire wall. Power for all of the electrical components disposed in and on the instrument panel assembly is supplied through the fire wall connectors.

In a preferred embodiment of the invention disclosed herein, an instrument panel assembly includes two separate electrical interconnection modules: one located on the driver side of the instrument panel and the other located on the passenger side. The driver-side interconnection module forms a receptacle for receiving an instrument cluster, and one or more connectors are disposed on the module so that they engage mating connectors on the cluster when it is inserted into the receptacle. After the instrument cluster has been inserted into the module receptacle such that the respective connectors on the two pieces are mated, the interconnection module is attached to the instrument panel housing. Other connectors may be located on the rearward-facing surface of the interconnection module such as to be placed in connection with mating connectors on other electrical components disposed in or on the instrument panel housing, or to components that will be placed in connection with the instrument panel housing later in the assembly process.

The passenger-side interconnection module has connectors disposed thereon which connect with mating connectors of electrical components built into or otherwise disposed on the instrument panel assembly, such as a glove box lamp circuit, an air bag actuation circuit, or a center console module.

Both the driver-side and passenger-side modules have main connectors disposed on their forward-facing surfaces for mating with connectors on the fire wall of the vehicle when the instrument panel assembly is installed in the passenger compartment. Positive engagement between the main connectors and their respective fire wall connectors is facilitated by lever-lock mechanisms integrated with the main connectors.

In the preferred embodiment, the driver-side interconnection module has bus bars disposed to form a junction block located at the extreme left or outboard end of the module. This placement permits the serviceable circuit components of the junction block (fuses, circuit breakers, relays, etc.) to be accessible through an opening in the end of the instrument panel housing. Other of the bus bars are disposed on the forward-facing surface of the module adjacent the junction block and form terminals of the main connector. Similarly, the passenger-side interconnection module has bus bars disposed at the extreme right or outboard end to form terminals of its main connector.

According to an additional feature of the invention, the connectors disposed on the interconnection module are of the self-docking or "floating" type. Self-docking connectors are mounted to the interconnection module in a manner that allows a small degree of movement in the plane normal to the axis along which connection is made. This movability allows for some amount of misalignment between the connectors on the interconnection module and their mating connectors as the electrical components are joined to the interconnection module and the interconnection module is joined to the fire wall.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a top view of the driver-side interconnection module and instrument cluster of the invention;

FIG. 4 is a front view of the driver-side interconnection module of FIG. 3;

FIG. 5 is a side view of the driver-side interconnection module of FIG. 3;

DETAILED DESCRIPTION OF THE PREFERRED EMBODIMENT

Figure 1:
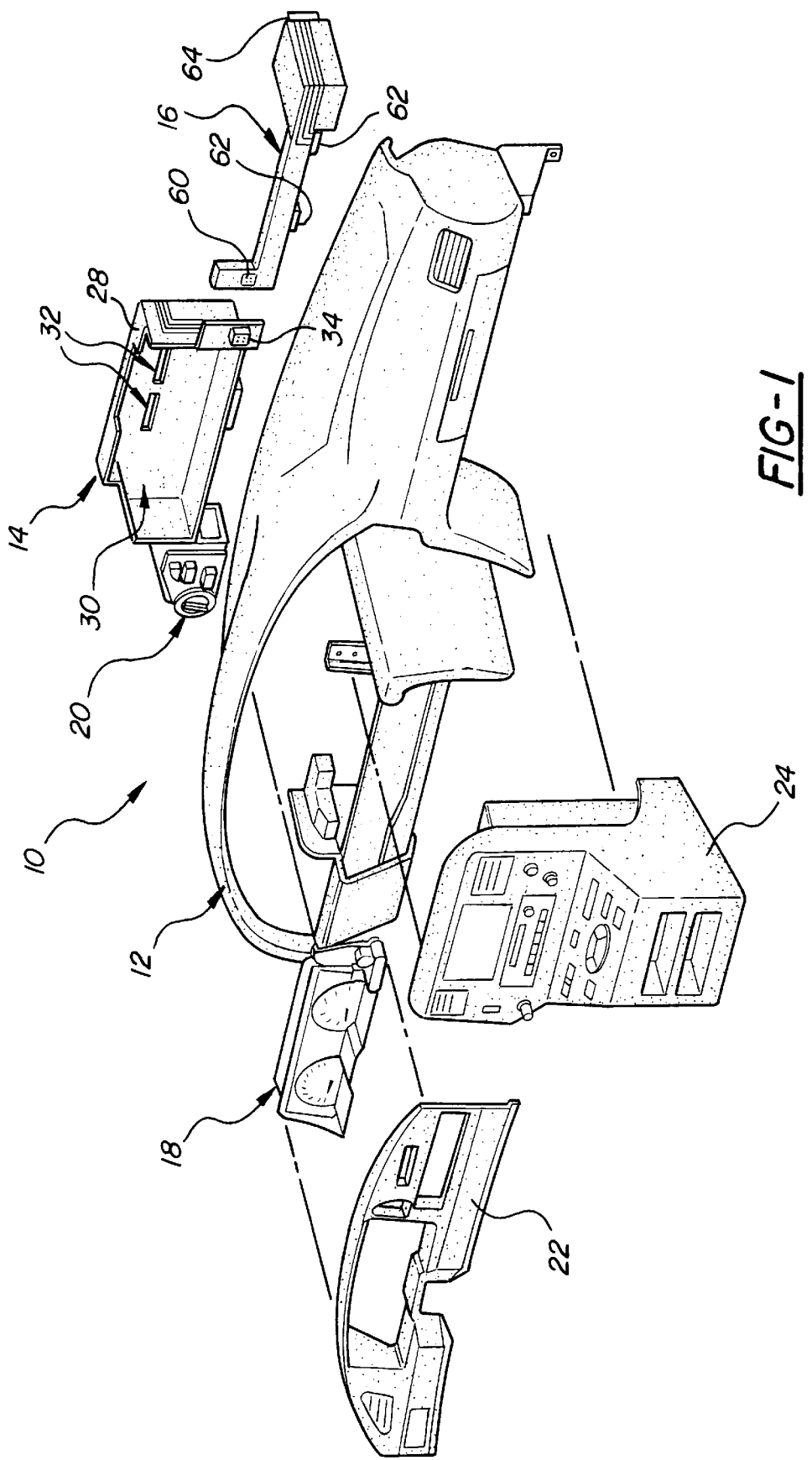
FIG. 1 is an exploded perspective view of an instrument panel assembly including driver-side and passenger-side interconnection modules according to the invention.
Figure 2:
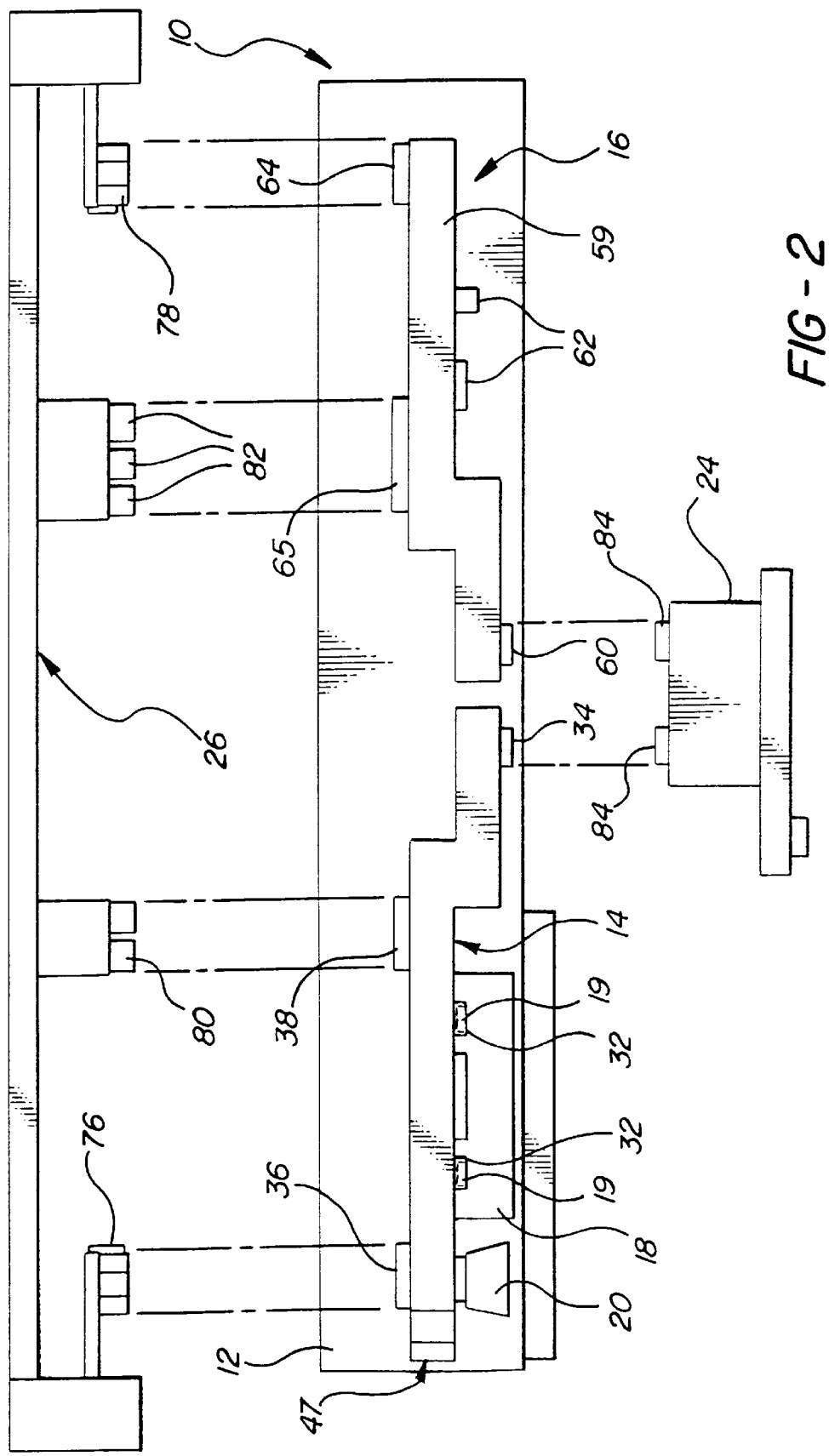
FIG. 2 is a schematic top view of the instrument panel assembly and fire wall of the vehicle.

As shown in FIGS. 1 and 2, an instrument panel (IP) assembly 10 for an automotive vehicle (not shown) has as its major components an IP housing 12, a driver-side electrical interconnection module 14, a passenger-side electrical interconnection module 16, an instrument cluster 18, a switch module 20, a bezel 22 and a center console 24. During manufacture of the vehicle, the IP assembly 10 is built up from the components 12–24 and the IP assembly is then placed inside the passenger compartment of the automotive vehicle and secured to the forward fire wall 26 (see FIG. 2), which may include side walls joined to the forward wall, separating the passenger compartment from the vehicle engine compartment.

It should be noted that all references made herein to directions such as left, right, front, rear, forward and rearward are relative to the vehicle as a whole. That is, the "front" surface of the IP is that which is oriented toward the front end of the vehicle, and the "rear" surface is that which is presented to an occupant of the vehicle when the IP is installed in the vehicle.

The driver-side interconnection module 14 is adapted to fit into engagement with the left side of the IP housing 12 and comprises a box-like shell 28 made up of relatively thin plastic panels which define a substantially rectangular receptacle 30 on the rearward-facing surface of the module 14. The forward-facing panel of the module 14 has a pair of multi-terminal connectors 32 disposed thereon. The connectors 32 are preferably of the self-docking type which, as is well known in the art, permit a degree of movement of the connectors in the plane of the panel. The connectors 32 are oriented such that their mating ends face toward the rear or open side of the receptacle 30.

A multi-terminal console connector 34 is disposed on the driver-side interconnection module 14 at a position adjacent the right or inboard end of the module 14. The console connector 34 is also of the self-docking type, and is oriented with its mating end facing rearwardly. A multi-terminal main connector 36 (FIG. 2) is disposed on the forward-facing surface of the module 14 adjacent the left or outboard end thereof, and has its mating end facing toward the front of the module 14. A multi-terminal expandable connector 38 is also disposed on the forward surface of the module 14. The expandable connector 38 comprises an outer frame 38a (see FIG. 4) defining two or more connector apertures 38b, one or more of which contains a connector module. How many of the connector apertures 38b contain a connector module depends upon the requirements of the particular vehicle, which may vary depending on how many electrically powered optional features are present on the vehicle. A connector of this type is disclosed in U.S. Pat. No. 5,328,388, the disclosure of which is incorporated herein by reference.

Referring now to FIGS. 3–5, a plurality of bus bars 40 are disposed on the driver-side interconnection module 14 on an end panel 14a adjacent to the left or outboard end of the module. The bus bars 40 are substantially flat, narrow straps of electrically conductive material such as copper, and may either overlie the outer and inner surfaces of the end panel 14a of the module or may fit into shallow channels formed in the surfaces.

A plurality of narrow grooves 42 are formed in the surfaces of the panels making up the driver-side interconnection module 14. These grooves 42 extend between the bus bars 40 and the various connectors 32,34,36,38. A single strand of uninsulated, solid core electrical wire 44 is disposed in each of the grooves 42, and the ends of each wire are connected to one of the terminals comprising the connectors 32,34,36,38 or to one of the busbars 40 in a manner to be described in detail below. The grooves 42 may be of rectangular cross-section or may have a rounded bottom to match the radius of curvature of the wire 44 inserted therein.

Figure 7:
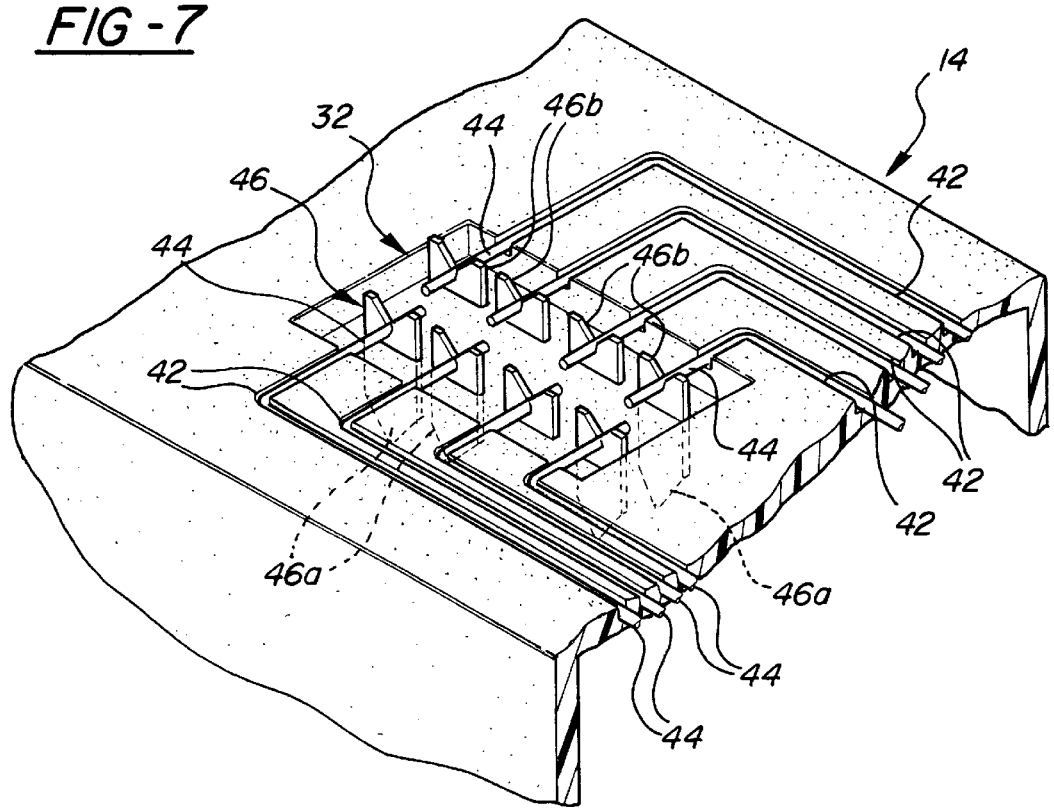
FIG. 7 is a perspective view of terminals of the front of the driver-side interconnection module, showing the terminal/wire connection.

As best seen in FIG. 7, the ends of the bus bars 40 form the connector terminals 46 having blade portions 46a for making connection with their respective mating connectors, and have insulation displacement connectors (IDCs) 46b formed integrally therewith at their ends opposite the blade portions. An IDC, as is well known in the art, comprises a small V-shaped notch formed in an electrically conductive element. The open end of the notch is wide enough to receive the diameter of the wire, and the notch narrows down to a width at its bottom that is slightly smaller than the diameter of the core of the wire. The interior edges of the notch are sharp enough that when a wire 44 is forced downwardly into the notch the edges of the notch bite into the core wire 44 to make electrical connection therewith.

The term "insulation displacement connectors" derives from the fact that IDCs are commonly used with insulated wires, the sharp edge of the notch cutting through the insulation to contact the core. IDCs may also, however be used with uninsulated, solid core wire 44, as depicted and described herein. Solid core wire 44 refers to wire 44 having a conductor that is a single strand of conductive material, rather than several thin strands braided together.

Referring back to FIGS. 4 and 5, certain end portions of the bus bars 40 are bent to form blade terminals 40a extending substantially perpendicularly from the surface of the interconnection module 14 toward the outside of the module. The blade terminals 40a of the bus bars disposed on the inner surface of the module panel project through slots in the panel. Other end portions of the bus bars 40 are bent to form the previously-mentioned IDCs which are disposed in or adjacent to the grooves 42 such that the wires 44 disposed within the grooves 42 may connect with the bus bars as shown in FIG. 7.

Figure 6:
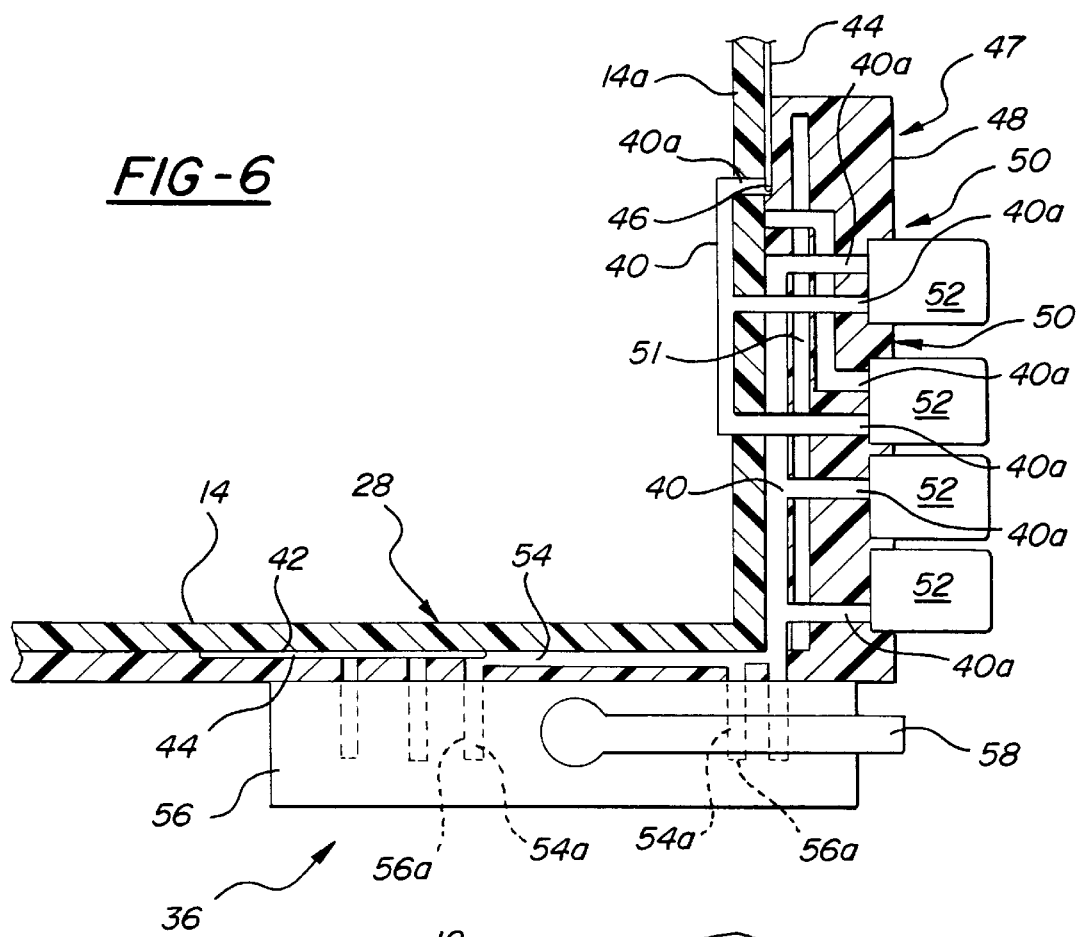
FIG. 6 is a cross sectional view taken along line 6—6 of FIG. 4.

Referring now to FIGS. 2, 3 and 6, a junction block 47 is disposed at the left end of the driver-side interconnection module 14 and covered by a junction block case 48 which fits over the surface of the module 14 to cover the bus bars ends 40a projecting from the junction block. The junction block case 48 has receptacles 50 formed on a first surface thereof to receive circuit components 52 such as fuses, circuit breakers and relays (see FIG. 6). Slots are formed in the case 48 such that the terminals of the circuit components 52 disposed in the receptacles 50 may project through the slots to make electrical contact with the ends 40a of bus bars 40 in junction block 47.

Still referring to FIG. 6, when the junction block case 48 is attached to the module end panel 14a such that the bus bar blade terminals 40a are extend into into the case, the bus bars 40 disposed on the end panel of the driver-side module 14 serve essentially as the lowermost layers of the junction block circuitry. The junction block case 48 may also contain one or more conductive layers 51 providing pathways between and connections with the circuit components 52 as necessary. By utilizing bus bars 40 disposed on the surfaces of the interconnection module end panel 14a as the lowermost layer of the junction block circuitry, the overall depth of the resulting junction block is reduced. The bus bars 40 also reduce the number of connectors needed because the bus bars effectively form circuits are incorporated into the plastic structure. Accordingly, the junction block projects outwardly from the surface of the module a distance less than a conventional junction block wherein all of the layers of bus bars and conductive layers are contained within upper and lower cases to form a separate, self-contained junction block which is then mounted in the end panel.

Several bus bars 54 are also disposed on the forward-facing surface of the front-most panel of the drivers-side module 14 (see FIG. 6). These bus bars 54 have ends 54a which bend out-of-plane to project forwardly away from the panel surface, some of which form IDCs disposed in or adjacent to ends of grooves 42 in the front-most panel such that wires 44 disposed therein may engage the IDCs and others of which have ends projecting forwardly from the panel surface and taking the form of blade terminals 54a.

Figure 9:
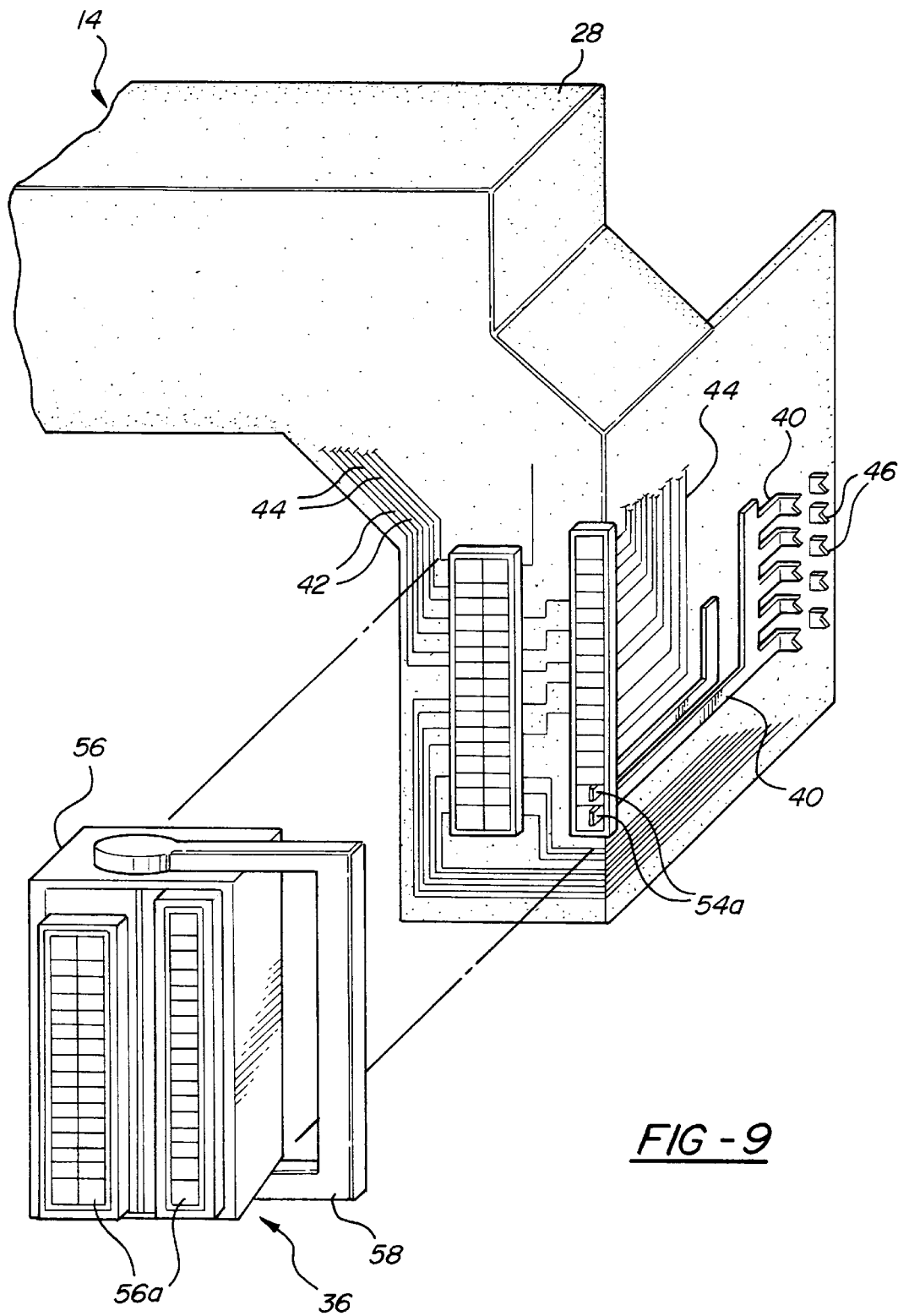
FIG. 9 is a fragmentary perspective view of the driver-side interconnection module.

Referring now to FIGS. 3, 6, and 9, the main connector 36 is formed by a connector case 56 which is attached to the forward-facing panel of module 14 to cover the bus bar blade terminals 54a. The bus bar blade terminals 54a fit into individual terminal chambers 56a formed in the connector case 56, and other terminal chambers of the connector case 56 receive IDC-type terminals connected with the wires 44 disposed in the grooves 42 adjacent the main connector 36. The connector case 56 has a locking lever 58 pivotally attached thereto.

Figure 10:
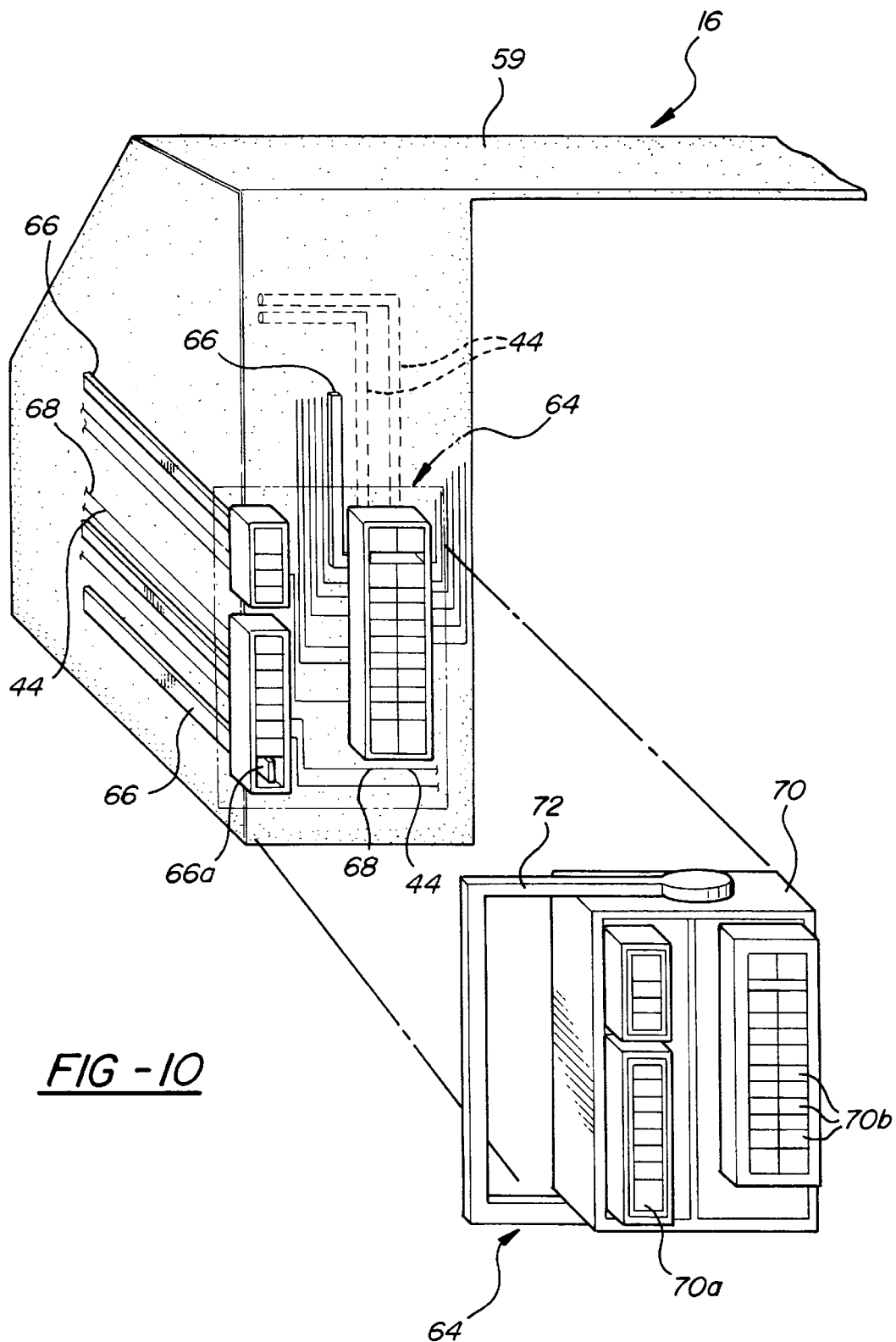
FIG. 10 is a fragmentary perspective view of the passenger-side interconnection module.

Referring now to FIGS. 1, 2 and 10, the passenger-side interconnection module 16 is similar in overall construction to the driver-side interconnection module 14, comprising a shell 59 made up of generally flat panels of plastic material and having a plurality of electrical connectors disposed at various location on the panels. A console connector 60 is located in a rearward-facing orientation adjacent to the left-hand or inboard end of the module, and one or more accessory connectors 62 are located in a generally central position on the rearward-facing surface of the module 16. A main connector 64 is disposed on a forward-facing surface of the passenger-side interconnection module 16. A multi-terminal expandable connector 65 is also disposed on the forward surface of the module 16.

Bus bars 66 are disposed on the surfaces of the passenger-side interconnection module 16 adjacent its right-hand or outboard end as best shown in FIG. 10. These bus bars 66 are similar in general configuration to those disposed on the driver-side interconnection module 14, some having integrally formed IDCs and some having ends which project outwardly from the surfaces on which the bus bars are disposed to form blade terminals.

Grooves 68 are formed in the surfaces of the panels making up the module 16 and interconnect some of the electrical connectors 60,62,64 and the bus bars 66. Wires 44 are disposed in the grooves 68 to connect with the IDCs of the bus bars 66 and with the connectors 60,62,64 in a fashion similar to that described with regard to the driver-side module 14.

Main connector 64 comprises a connector case 70 which is attached to the passenger-side interconnection module 16 to substantially cover the bus bars 66 on the forward-facing panel portion of module 16 such that the blade terminals 66*a* of the bus bars fit into individual terminal chambers 70*a* formed in the connector case. Other terminal chambers 70*b* of the connector case 70 receive terminals connector 64 connected with the wires 44 disposed in the grooves 68 adjacent the main connector 64. A locking lever 72 is pivotally attached to the connector case 70.

The construction of the interconnection modules 14,16 adapts them for economical manufacture by an automated process. The shells 28,59 are injection molded to include the grooves 42,68. After the shells 28,59 are removed from their respective molds (not shown), the wires 44 are preferably routed along the grooves 42,68 by means of automated apparatus designed for this purpose. An example of such apparatus is disclosed in U.S. Pat. No. 5,476,520, the disclosure of which is incorporated herein by reference.

Figure 8:
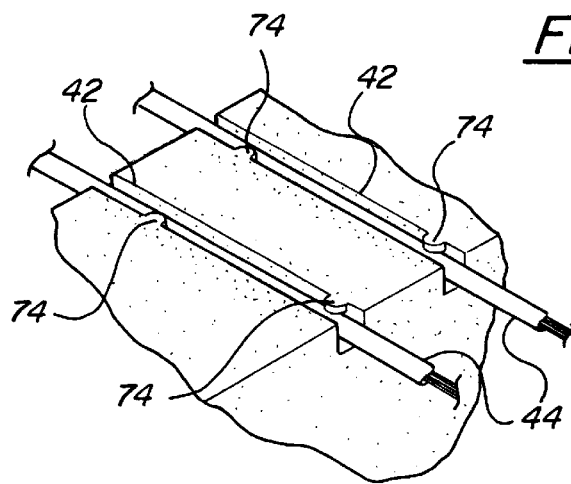
FIG. 8 is a detail showing the wire grooves on the driver-side interconnection module.

The wires 44 may be restrained within the grooves 42,68 by an interference fit achieved by small tabs 74 (see FIG. 8) formed integrally with the panels at intervals along the grooves and extending over the open tops thereof a small distance. The tabs 74 are sufficiently flexible to deflect slightly to allow the wires 44 to be urged past the tabs as the wires are inserted into the grooves 42,68.

Alternatively, the wires 44 may be secured in their respective grooves 42,68 by means of ultrasonic welding. This may be achieved by mounting an ultrasonic welding head directly on the apparatus which lays the wires 44 in the grooves 42,68 so that each wire 44 is welded in place within its respective groove as it is laid therein. It is also possible to lay all or most of the wires 44 in their grooves 42,68 and make numerous ultrasonic welds simultaneously at the desired positions to secure the wires in place. Tabs of plastic similar to those used to achieve the interference fit may be disposed adjacent the edges of the grooves 42,68 in order that they may be melted by the ultrasonic welding process and flow around the wire 44 to secure it in place.

The bus bars 40,66 may be inserted into connection with the modules 14,16 by an automated process utilizing robotic assembly equipment as is well known in the field of automotive vehicle manufacturing. The bus bars 40,66 may be held in position in their appropriate channels and slots by adhesive, by an interference fit, or by ultrasonic welding.

Referring back to FIGS. 2 and 3, the IP assembly 10 is assembled by first inserting the instrument cluster 18 into the receptacle 30 of the driver-side interconnection module 14 such that connectors 19 on the cluster 18 engage the self-docking connectors 32 disposed within the receptacle 30 (see FIG. 3). The switch module 20 is also placed in connection with the driver-side interconnection module 14 so as to mate with its respective self-docking connector 76 (see FIG. 2). The driver-side and passenger-side interconnection modules 14,16 are then placed within the IP housing 12 and secured thereto by conventionally known means such as threaded fasteners or snap latches formed integrally with the IP housing and the modules. Placement of the driver-side and passenger-side interconnection modules 14,16 into the IP housing 12 puts the self-docking connectors 36,38,64,65 on the forward-facing surfaces of the modules 14,16 in engagement with the respective mating connectors 76,80, 78,82 within the IP housing. Connectors 38,65,80,82 may not be necessary depending on circuit design and system content. Accessory connectors 62 on passenger-side module 16 engage mating connectors disposed on the IP housing 12 to power other electrical systems located within the housing. Examples of such systems are an air bag system inflation circuit or a glove box lamp circuit.

Figure 11:
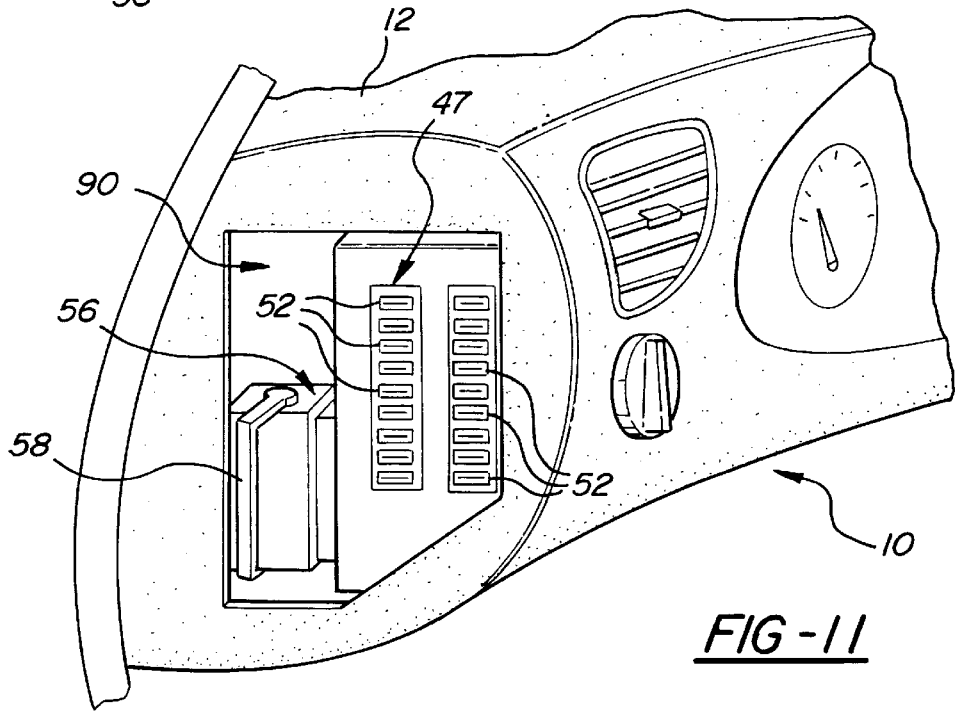
FIG. 11 is a perspective view of the instrument panel assembly of FIG. 1.

Referring now to FIGS. 6 and 11, when the driver-side interconnection module 14 is mated with the IP housing 12, the junction block 47 is positioned in alignment with a window 90 formed in a corresponding location at the extreme left end of the IP housing 12 (see FIG. 11). A removable or openable door (not shown) may be fitted to the window 90. The junction block 47 is accessible through the window 90 to allow circuit components 52 within the junction block to be inspected and changed as necessary.

After the driver-side and passenger-side interconnection modules 14,16 have been attached to the IP housing 12 to form part of the overall IP assembly 10, the IP assembly 10 is inserted into the vehicle passenger-compartment and mated with the forward fire wall 26. The mating procedure involves positioning the IP assembly 10 so that the main connectors 36,64 on the forward-facing sides of the interconnection modules 14,16 are in alignment with and fit into engagement with mating connectors 76,78 disposed on the fire wall 26. The IP assembly 10 is then secured to the fire wall 26 by conventionally known means such as threaded fasteners, push-in fasteners and/or snap latches. The expandable connectors 38,65 on the interconnection modules 14, 16 also mate with their respective mating connectors 80,82 on the fire wall 26 during this step. The mating connectors 76,78,80,82 disposed on the fire wall 26 are preferably of the self-docking type to allow for greater ease of installation of the IP assembly 10.

After the IP assembly 10 is properly positioned with respect to the fire wall 26 such that the main connectors 36,64 are at least partially engaged with their mating fire wall connectors 76,78, the locking levers 58,72 on the main connectors are rotated by hand toward the locked position to positively engage with the fire wall connectors. The locking levers 58,72 are accessible by reaching underneath the IP assembly 10.

The center console 24 next is inserted into the vehicle passenger compartment and placed in engagement with the IP assembly 10. Connectors 84 on the forward-facing surface of the console 24 mate with the console connectors 34,60 of the driver-side and passenger-side interconnection modules 14,16 to provide electrical connections necessary to supply power to the systems built into the center console 24. Examples of such electrical systems built into the center console 24 are a clock, stereo system, CD player and various controls for other systems. Alternatively, the center console 24 may be placed in connection with the IP assembly 10 prior to the assembly being mated with the fire wall 26.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An electrical interconnection module for electrically connecting first and second electrical components comprising:
   an instrument panel adapted to mount the first and second electrical components at least one of which is adapted to be an instrument on the panel, and further adapted to be mounted as a panel in a vehicle interior for electrical connection with a vehicle electrical system;
   first and second means disposed on the panel for making electrical connection with electrical connectors disposed on the first and second electrical components;
   an elongated groove formed in a surface of the panel and extending from a point adjacent the first electrical connection means to a second point adjacent the second electrical connection means;
   a wire disposed in and extending along the groove and having a first end in electrical connection with the first electrical connection means and a second end in electrical connection with the second electrical connection means to electrically connect the first and second electrical components;
   at least one bus bar electrically connected with the wire and projecting from a surface of the panel; and
   an electrical junction block disposed on the panel such that the at least one bus bar extends into electrical connection with the junction block.

2. Apparatus according to claim 1 wherein the panel comprises a receptacle for receiving the first electrical component and the first electrical connection means is disposed to engage the electrical connector of the first electrical component when the first electrical component is inserted into the receptacle.

3. Apparatus according to claim 2 wherein the electrical interconnection module further comprises means for mating with an instrument panel housing of an automotive vehicle such that the first electrical component is visible to occupants of a passenger compartment of the vehicle.

4. Apparatus according to claim 3 wherein the first electrical component comprises an instrument cluster.

5. Apparatus according to claim 3 wherein the second electrical connection means comprises means for mating connection with a bulkhead connector of the automotive vehicle.

6. Apparatus according to claim 5 wherein the means for mating connection with the bulkhead connector comprises a lever-lock connector.

7. Apparatus according to claim 1 wherein the first electrical connection means comprises a multi-pin, self-docking connector.

8. Apparatus according to claim 1 wherein the at least one bus bar is connected to the wire by an insulation displacement connector formed integrally with the bus bar.

9. Apparatus according to claim 1 wherein the wire is connected to at least one of the first and second connection means by an insulation displacement connector.

10. Apparatus according to claim 1 wherein the wire is secured in the groove by ultrasonic welding.

11. Apparatus according to claim 1 wherein the wire is secured in the groove by an interference fit.

12. An instrument panel assembly for installation in a passenger compartment of an automotive vehicle having a bulkhead and a bulkhead electrical connector disposed thereon, the instrument panel assembly comprising:
    an instrument panel housing;
    an electrical component;
    an electrical interconnection module secured to the instrument panel housing and having means for receiving and making electrical connection with the electrical component and means for making electrical connection with the bulkhead connector;
    at least one elongated groove formed in a surface of the electrical interconnection module and extending from a point adjacent the means for making electrical connection with the electrical component to a second point adjacent the means for making electrical connection with the bulkhead connector; and
    a wire disposed in and extending along the groove and having a first end in electrical connection with the means for making electrical connection with the electrical component and a second end in electrical connection with the means for making electrical connection with the bulkhead connection.

13. Apparatus according to claim 12 further comprising at least one bus bar electrically connected with the wire and projecting from a surface of the electrical interconnection module; and
    an electrical junction block disposed on the electrical interconnection module such that the at least one bus bar extends into electrical connection with the junction block.

14. Apparatus according to claim 12 wherein the electrical component comprises an instrument cluster.

15. Apparatus according to claim 12 wherein the means for making electrical connection with the electrical component comprises a self-docking multi-pin connector.

16. Apparatus according to claim 12 wherein the means for making electrical connection with the bulkhead connector comprises a self-docking multi-pin connector.

17. Apparatus according to claim 13 wherein the at least one bus bar is connected to the wire by an insulation displacement connector formed integrally with the bus bar.

18. Apparatus according to claim 12 wherein the wire is connected to at least one of the means for making electrical connection with the electrical component by an insulation displacement connector.

19. Apparatus according to claim 12 wherein the wire is secured in the groove by ultrasonic welding.

20. Apparatus according to claim 12 wherein the wire is secured in the groove by an interference fit.

* * * * *

UNITED STATES PATENT AND TRADEMARK OFFICE
CERTIFICATE OF CORRECTION

PATENT NO : 6,048,020
DATED : April 11, 2000
INVENTOR(S) : Gronowicz

It is certified that error appears in the above-identified patent and that said Letters Patent is hereby corrected as shown below:

Column 6, line 18 - delete "are"

Column 6, line 18 - delete "into" (second occurrence);

Column 7, line 24 - insert --from-- before "connector 64"

Column 8, lin3 56 - delete "next is" and insert --is next--

Signed and Sealed this

Twenty-seventh Day of March, 2001

Attest:

NICHOLAS P. GODICI

*Attesting Officer*      *Acting Director of the United States Patent and Trademark Office*